United States Patent [19]
Johnson et al.

[11] Patent Number: 4,659,930
[45] Date of Patent: Apr. 21, 1987

[54] RADIATION HARD VISIBLE LIGHT READOUT CIRCUIT

[75] Inventors: Allan P. Johnson, Minneapolis, Minn.; Ronald W. Shovan, Clearwater, Fla.

[73] Assignee: Honeywell Inc., Minneapolis, Minn.

[21] Appl. No.: 814,341

[22] Filed: Dec. 27, 1985

[51] Int. Cl.[4] .......................... G01J 1/00; H01J 40/14
[52] U.S. Cl. ............................ 250/336.1; 250/214 C; 307/311
[58] Field of Search ............. 250/336.1, 214 P, 214 R, 250/214 C; 307/311

[56] References Cited
U.S. PATENT DOCUMENTS 3,895,230 7/1975 Itagaki .................... 250/214 P
4,035,634 7/1977 Numata .................... 250/214 P Primary Examiner—Janice A. Howell
Attorney, Agent, or Firm—Robert A. Pajak

[57] ABSTRACT

A pair of photodetectors are electrically connected in series. A common interconnection point of the two photodetectors is electrically connected to the inverting input of an opertional amplifier to provide a signal indicative of visible light falling on one of the photodetectors. The other of the photodetectors is masked to block visible but allow a response to non-visible radiation in the form of gamma, x-rays and the like.

8 Claims, 2 Drawing Figures

RADIATION HARD VISIBLE LIGHT READOUT CIRCUIT

The Government has rights in this invention pursuant to Contract No. F04704-84-C-0056, awarded by the Department of the Air Force.

FIELD OF THE INVENTION

The present invention relates to photodetector readout circuits responsive to visible light, and more specifically to laser light beams.

BACKGROUND OF THE INVENTION

Radiation hardening of circuit components is a major concern where such circuits have a critical function.

Tremendous strides have been made in the field of semiconductors for making components radiation hard, that is, circuits which may be impervious to electromagnetic radiation from gamma and x-rays. However, photosensitive circuits and photodetector components have a problem unlike other components since they must be responsive to electromagnetic radiation in the form of visible light, or other selected portion of the frequency spectrum.

BRIEF DESCRIPTION OF THE INVENTION

A pair of photodetectors are electrically connected in series. A common interconnection point of the two photodetectors is electrically connected to an inverting input of an operational amplifier to provide a signal indicative of visible light falling on one of the photodetectors. The other of the photodetectors is masked to block visible but allow a response to non-visible radiation in the form of gamma, x-rays and the like.

DETAILED DESCRIPTION OF THE DRAWINGS

DETAILED DESCRIPTION OF THE INVENTION

Figure 1:
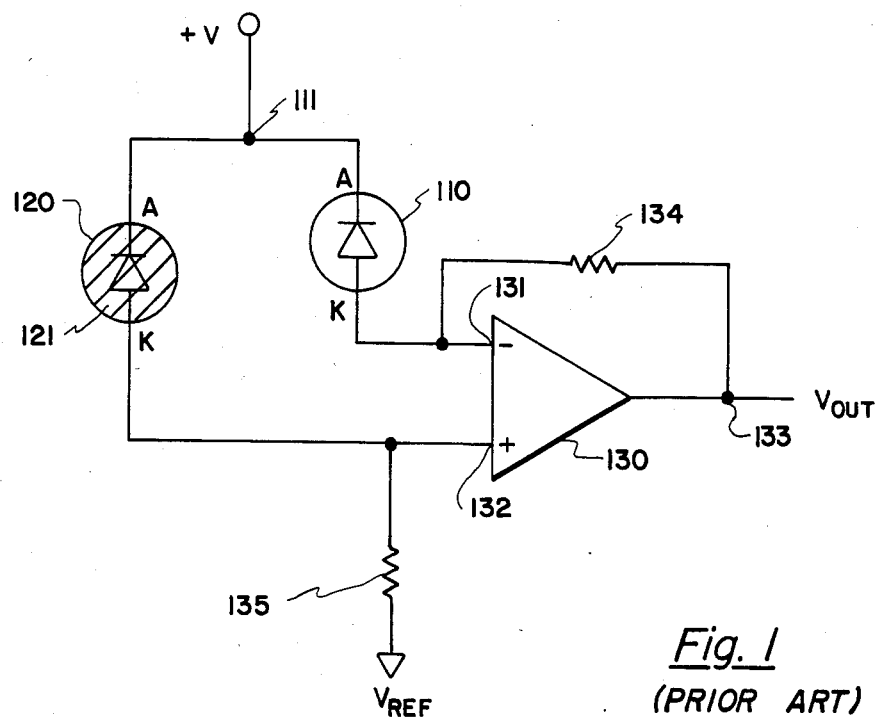
FIG. 1 is a schematic diagram showing a conventional radiation hard readout circuit known in the prior art.

As indicated above, a photocurrent will be generated in a photodiode by x-ray and gamma ray electromagnetic radiation in much the same way that visible light generates a photocurrent. Therefore, in the prior art the effects of radiation induced photocurrents were reduced by use of the circuit illustrated in FIG. 1. A photodiode 110 has its anode connected to a common interconnection 111 which is electrically connected to a supply voltage 112 indicated as "30 V". The cathode thereof is electrically connected to an inverting input 131 of high-gain operational amplifier 130. Another photodiode 120 has its anode connected to common interconnection point 111, and the cathode thereof is electrically connected to the non-inverting input 132 of operational amplifier 130. The output 133 of the operational amplifier 130 is electrically connected to the inverting input 131 through an impedance shown as a resistance 134. The non-inverting input is also electrically connected to a reference potential $V_{ref}$, typically at ground potential, through a resistance 135 which is identically matched to resistance 134.

The circuit components of the circuit of FIG. 1 are chosen to be radiation hard, and specifically the operational amplifier and photodiodes 110 and 120. Photodiodes 110 and 120 are chosen to be matched photodiodes having substantially identical electrical and thermal characteristics. Photodiode 120 is masked for blocking visible light incident on the photodiode and permitting x-ray and gamma radiation to pass therethrough. A mask 121 for photodiode 120 may be provided by the use of a metallic coating on diode 120 such as aluminum.

In operation of the circuit of FIG. 1, visible light on photodiode 120 will be detected and amplified in the usual manner. However, any x-ray and gamma radiation incident on both diodes 110 and 120 will present nearly identical signals at the inverting and non-inverting inputs of the operational amplifier 130. The amount of mismatch is governed by the mismatch of photodiodes and resistors 134 and 135.

Resistor 135 provides for common dc bias for both diodes 110 and 120, as is well known. For good common mode rejection, resistors 134 and 135 need to be matched.

The common portion of the radiation signal is greatly attenuated by the common mode rejection of the operational amplifier. At low frequencies the common mode rejection ratio of a good operational amplifier may be 100,000 to 1 or greater. Thus, the matched portion of the radiation signal is reduced by five orders of magnitude before reaching the output of the operational amplifier. However, most radiation environments of concern are of a pulsed nature. In these circumstances, i.e. pulsed radiation the common mode rejection of the circuit of FIG. 1 is very small or nonexistent.

Figure 2:
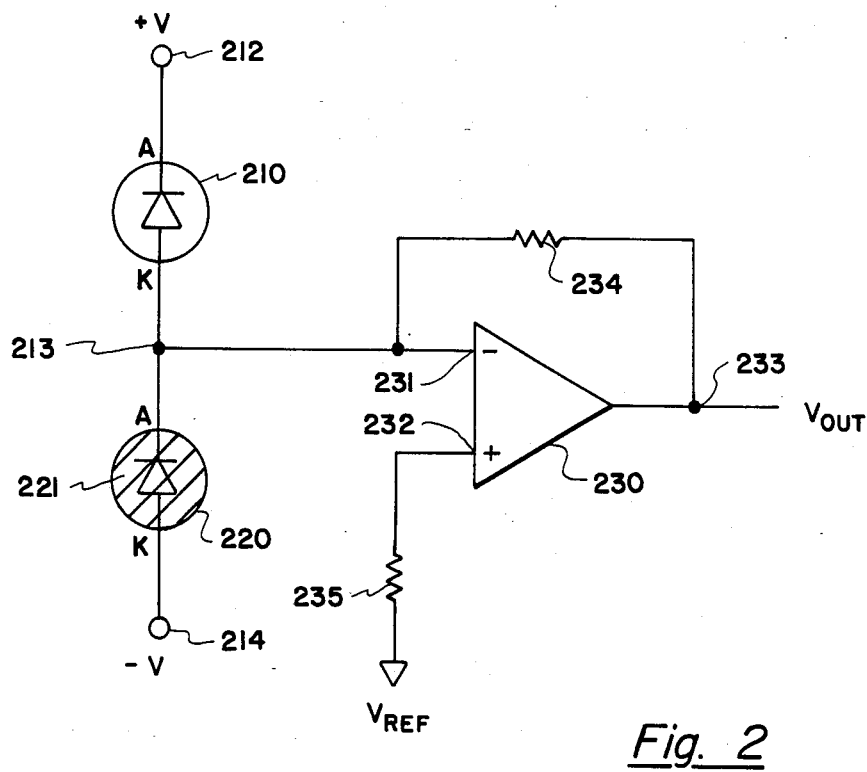
FIG. 2 is a schematic circuit diagram illustrating the invention.

FIG. 2 shows a circuit diagram of a radiation hard circuit of the present invention which provides pulsed radiation rejection. A photodiode 210 has its anode connected to a first voltage supply 212, indicated as "+V", and the cathode thereof is electrically connected to a common interconnection means 213. The common interconnection means is electrically connected to an inverting input 231 of high-gain operational amplifier 230. Another photodiode 220 has its anode connected to common interconnection point 213, and the cathode thereof is electrically connected to to a second voltage supply 214 indicated as "−V". The output 233 of the operational amplifier 230 is electrically connected to the inverting input 231 through an impedance shown as a resistance 234. The non-inverting input 232 of amplifier 230 is electrically connected to a reference potential $V_{ref}$ through a resistance 235.

Like the circuit components of the circuit of FIG. 1, the circuit components of FIG. 2 are chosen to be radiation hard, and specifically the operational amplifier and photodiodes 210 and 220. Photodiodes 210 and 220 are chosen to be matched photodiodes having substantially identical electrical and thermal characteristics. Photodiode 220, like photodiode 120, includes a thin metal coating or mask 221 for blocking visible light incident on the photodiode and permitting x-ray and gamma radiation to pass therethrough.

In the circuit of FIG. 2 diodes 210 and 220 are connected in series across matched plus and minus supply voltages 212 and 214. If no radiation is present, then the circuit of FIG. 2 operates in a similar manner to the circuit of FIG. 1. In the presence of radiation, the radiation induced photocurrent in diode 210 is compensated by the radiation induced photocurrent in diode 220. In these circumstances, only a small amount of signal due to any mismatch in photodiodes 210 and 220 will reach the input of the operational amplifier. It should be noted that the compensation provided by the circuit of FIG. 2 is frequency independent so that compensation for a short pulse of radiation is as effective as compensation of steady state radiation.

Like FIG. 1, resistor 235 is intended to provide for compensation for input bias current of the operational amplifier. However, in the circuit of FIG. 2, because of the series connection of diodes 210 and 220, resistors 234 and 235 need not be matched. Furthermore, resistor 235 may be omitted if it is not necessary to compensate for input bias currents of the operational amplifier.

The circuit of FIG. 2 may be constructed by a variety of available components. Specifically, the operational amplifier may be provided by a Northrup piece part identified as 3M0114H. The photodiodes may be of a radiation hard construction and may be obtained from Harris Corporation having part no. HS1061. Specifically, the diodes may function in a manner as to produce a photocurrent in the order of 0.4 A in response to one microwatt of visible radiation. Thus, the photodiodes serve as current sources or sinks.

It should be noted that the photodiode 210, in FIG. 2, serves as a current source having an output as a function of all radiation. On the other hand, photodiode 220 serves as a current sink having an output as function of non-visible radiation. In the arrangement of FIG. 2, amplifier 230 serves as a trans-impedance amplifier. In other words, the amplifier serves as a means for producing an output voltage proportional to the input current. The input current to amplifier 230 is the net resulting current difference between the current source, photodiode 210, and the current sink, photodiode 220. In the presence of only visible radiation, the input current to amplifier 230 is only that produced by photodiode 210 since photodiode 220 is impervious to visible light.

The embodiments of the invention in which an exclusive property or right is claimed are defined as follows:

1. A radiation hard visible light readout circuit responsive to laser beam emissions comprising:
   a first photodetector responsive to visible light, said first photodetector having a first terminal means being electrically connected to a first energization source, and a second terminal means electrically connected to a common interconnection means;
   a second photodetector having substantially identical electrical and thermal characteristics as said first photodetector, said second photodetector having a first terminal means being electrically connected to a second energization source, and a second terminal means electrically connected to said common interconnection means, said second photodetector having mask means for blocking visible light incident on said second photodetector and permitting X-ray and gamma radiation to pass therethrough and impinge on said second photodetector; and
   means having an input means electrically connected to said common interconnection means for providing an output signal as a function of current flowing into said input means.

2. The readout circuit of claim 1 wherein said first and second photodetectors are photodiodes electrically connected such that the cathode of one photodiode and anode of the other photodiode are electrically connected to said common interconnection means.

3. The readout circuit of claim 2 wherein said photodiode is a radiation hard diode.

4. The readout circuit of claim 1 wherein said visible light is in the form of a laser beam.

5. A radiation hard visible light readout circuit responsive to laser beam emissions comprising:
   a first photodetector responsive to visible light, said first photodetector having a first terminal means being electrically connected to a first energization source, and a second terminal means electrically connected to a common interconnection means;
   a second photodetector having substantially identical electrical and thermal characteristics as said first photodetector, said second photodetector having a first terminal means being electrically connected to a second energization source, and a second terminal means electrically connected to said common interconnection means, said second photodetector having mask means for blocking visible light incident on said second photodetector and permitting X-ray and gamma radiation to pass therethrough and impinge on said second photodetector; and
   high gain amplifier means having an inverting input, a non-inverting input, and an output, said inverting input electrically connected to said common interconnection means, said amplifier output being electrically connected to said amplifier inverting input through an impedance means for selecting the gain of said readout circuit, and said non-inverting input being electrically connected to a selected reference potential.

6. The readout circuit of claim 5 wherein said first and second photodetectors are photodiodes electrically connected such that the cathode of one photodiode and anode of the other photodiode are electrically connected to said common interconnection means.

7. The readout circuit of claim 6 wherein said photodiode is a radiation hard diode.

8. The readout circuit of claim 5 wherein said visible light is in the form of a laser beam.

* * * * *